Figure 7:
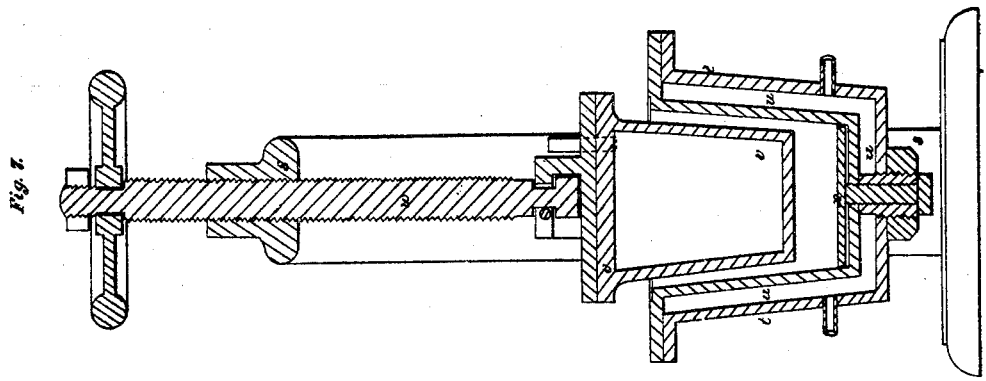

N. Hayward.
Vulcanizing Apparatus.
Nº 11,608. Patented Aug. 29, 1854.
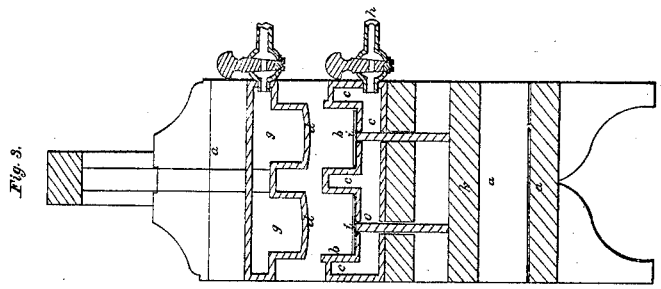
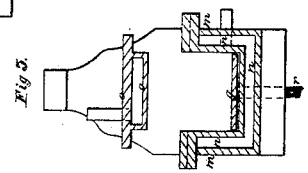
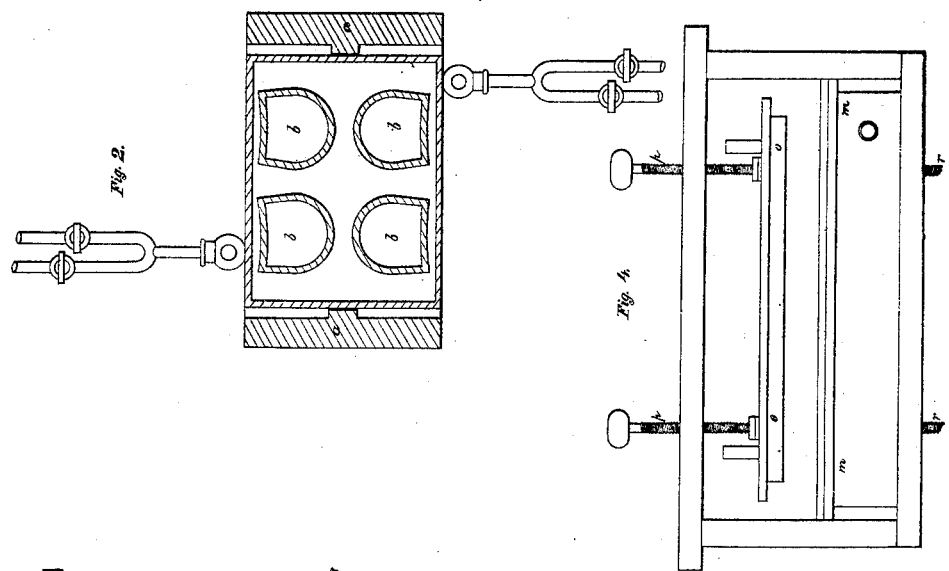
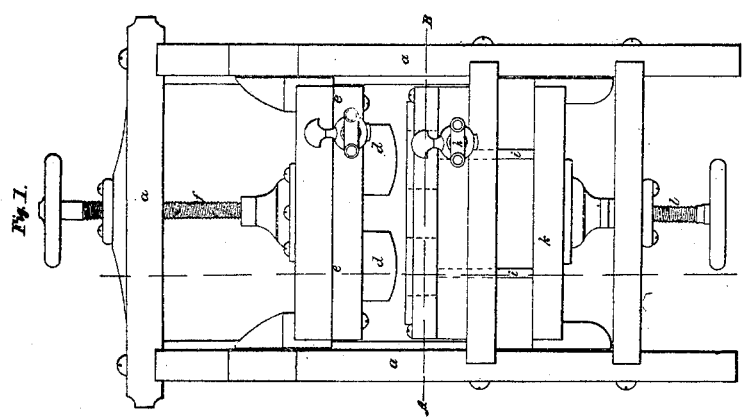

D. Hayward.
Vulcanizing Apparatus.
N° 11,608.   Patented Aug. 29, 1854.

Sheet 1, 2 Sheets.

UNITED STATES PATENT OFFICE.

DANIEL HAYWARD, OF PROVIDENCE, RHODE ISLAND.

MANUFACTURE OF INDIA-RUBBER.

Specification forming part of Letters Patent No. 11,608, dated August 29, 1854; Reissued July 6, 1869, No. 3,531.

*To all whom it may concern:*

Be it known that I, DANIEL HAYWARD, of Providence, in the county of Providence and State of Rhode Island, have invented certain new and useful Improvements in the Manufacture and in the Process of Manufacturing Vulcanized Rubber, and that the following description, taken in connection with the accompanying drawings, hereinafter referred to, forms a full and exact specification of the same, wherein I have set forth the nature and principles of my said improvements by which my invention may be distinguished from others of a similar class, together with such parts as I claim and desire to have secured to me by Letters Patent.

Hitherto the value of vulcanized rubber has ceased, when the various articles, to the construction of which it has been applied, have become worn out or served the purposes for which they were prepared, as it is well known, and necessarily follows from the process by which vulcanized rubber is cured, that it possesses properties which effectually prevent its being worked over, or used a second time, either by the ordinary application of heat, which consumes and destroys it, or by any other process known prior to my invention.

My improvements consist first in a process for working over vulcanized rubber and molding it into any desired shape. By this process, also, many foreign articles may be so incorporated with india rubber, or caoutchouc, either in its native state or when vulcanized, or otherwise prepared, as to produce a substance which has all the valuable properties of vulcanizing rubber, and yet has but little rubber in its composition, thereby so reducing the cost of vulcanized rubber, as to admit of its being much more extensively used than hitherto, and applied to many new and useful purposes.

The principal features of my new process consist in applying heat either to india rubber in its native state, or to rubber with the substances commonly used in vulcanizing rubber, or to rubber which has once been vulcanized by means of steam, the rubber or compound, while thus heated, being pressed into molds or dies which give it the desired form, and the steam being conducted around all portions of the molds or dies which come in contact with the rubber or compound to be acted upon. By this means, the process of curing rubber is greatly facilitated, and vulcanized rubber, which has hitherto resisted all attempts to remold it, readily pressed into any desired shape. By thus treating rubber also, many foreign articles, such as scraps of cloth, sulfur, white lead, coal, or wood tar, or any adhesive substance, may be so combined with it, as to produce a substance which has all the valuable properties of vulcanized rubber, although the greater bulk of it is composed of other and cheaper materials. I also regulate the induration of the rubber, or substance thus formed, at pleasure, by permitting the escape of the steam, and admitting cold water around the molds and dies in its stead, thereby checking the curing of the rubber at any desired stage of the process.

In order to illustrate the application of my process to the manufacture of different articles, I shall proceed to describe my method of making boot and shoe heels, planks, and buckets, and the substances of which they are composed.

In the accompanying drawings, Figure 1, plate 1 is an elevation of my apparatus for making boot heels. Fig. 2 is a horizontal section of the same taken in the plane of the line A B Fig. 1. Fig. 3 is a transverse vertical section of the same taken in the plane of the line C D, Fig. 1. Fig. 4 is a side elevation of the apparatus for making planks, and Fig. 5 a central transverse vertical section of the same. In plate 2 Fig. 6 is a front elevation of the apparatus for making buckets, and Fig. 7 a central vertical section of the same.

I shall first describe the apparatus for making boot and shoe heels. *a a a*, in Figs. 1, 2, and 3, plate 1, represent the framework of the apparatus. *b, b*, &c., are the molds in which the heels are shaped and cured, and have formed all around their bottoms and sides a hollow space or chamber *c c*. The dies *d, d,* &c., are attached to a sliding frame *e, e,* which is moved up and down by a screw *f*, as will readily be understood by inspection of Fig. 1, plate 1. These dies are hollow, and communicate with, and form a part of a chamber *g g*, Fig. 3, plate 1. The different substances of which the heels are to be composed, such as old pieces of vulcanized rubber, scraps of cloth, sulfur, white lead, coal tar, &c., are first mashed, ground, or kneaded together, by being passed through calender rolls, or by any of the methods commonly practiced, and then placed in the molds b b. Steam is then admitted through the pipe h into the chamber c c c and circulates through the same, and entirely around the sides and bottoms of the molds, which are thus heated by the steam. Every part of the rubber or substance which comes in contact with the molds will thus be heated by the steam, the heat of which will gradually fuse, as it were, all the substances in the molds. By then depressing the dies d d, into the chamber g g of which steam has been admitted, the proper shape will be given to the heel. After the heels have been exposed to the heat of the steam long enough to become sufficiently hardened, they are pressed out of the molds by followers i, i, i, i, which are pushed up by the sliding bar k k actuated by the screw l. In order to check the curing or induration of the top of the heel, so that it may adhere to the boot or shoe, the steam is permitted to escape from the chamber g g about the dies, before the heels are taken out from the molds and cold water admitted in its stead, which checks the induration of the top of the heel and produces the desired effect. In the same manner, cold water may be admitted into the chamber c c about the molds, and the amount to which the heels shall be cured thereby regulated at pleasure.

The apparatus for making planks, represented in Figs. 4 and 5 of plate 1, consists of a mold m m, surrounded by a chamber n n, and a hollow movable die or pressure platform o o, actuated by screws p, p. The rubber and other substances to be cured, and shaped, are placed in the mold m m, and the die n n then pressed upon the same. Steam is then introduced into the hollow die, and into the chamber a a, about the mold m m. The planks are then cured by the action of the steam and shaped by pressure as in the first described method of making heels. The plank when finished are pressed out of the mold by means of a follower q, actuated by screws r, r.

Figure 6:
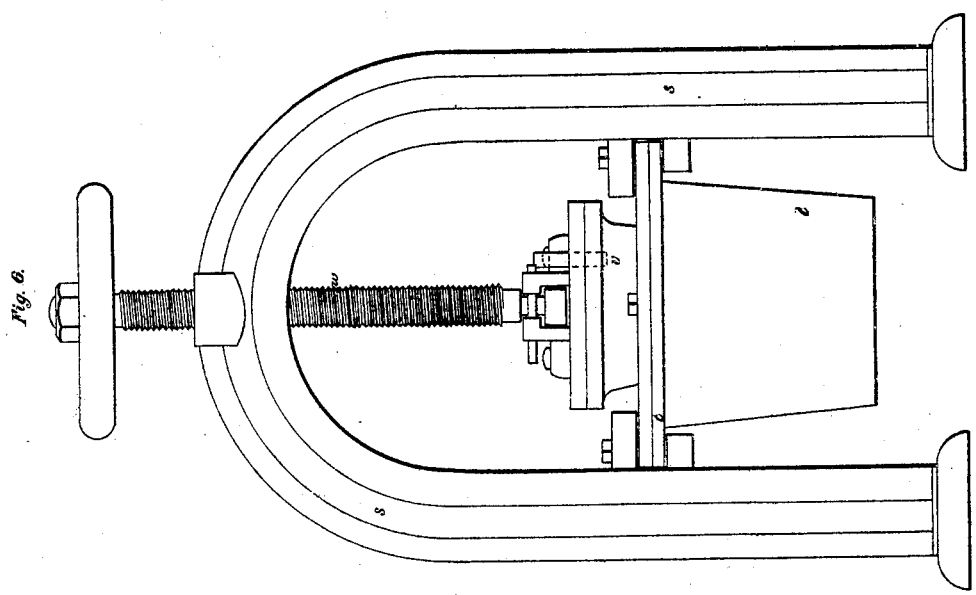

In plate 2, Figs. 6 and 7, the apparatus for making buckets is represented. It consists of a framework s s, supporting a mold t t of proper shape for forming the bucket. This mold is formed of an inner and outer casing, leaving a space or chamber u u all around the sides and bottom of the mold. v v is a hollow die, corresponding in shape to the shape of the mold t t, but of smaller diameter, and actuated so as to be moved up and down by a screw w. The rubber and other substances, hereinbefore mentioned, of which the buckets are to be composed, are combined together as before, in any desired proportions, and placed in the mold t t, when the die v v is depressed and presses against the substance between it and the mold. Steam is introduced into the chamber u, about the mold, and also into the hollow die v v, so that every part of the compound in the mold, will come in contact with a surface heated by steam, whereby the different substances will be completely fused, and form an indurated substance having all the valuable properties of vulcanized rubber. The bucket, when finished, is pressed out of the mold, by a movable follower x on the bottom of the same.

The three varieties of apparatus herein above described, sufficiently illustrate the application of my improved process to the production of different articles manufactured of rubber or its compounds, and it will be seen, that an essential feature of my process, consists in so introducing steam to the molds, and dies, as to cause it to circulate entirely through and around the same, so that every part of the rubber or compound which bears against the molds or dies should come in contact with a surface heated by steam. The action of the steam, thus circulating within the molds and dies, produces a heat which causes the complete fusion of the different substances of which the article to be manufactured is compounded, to which the requisite shape or form is readily imparted by the pressure of the dies.

The rubber and its compounds commonly used, together with the other foreign substances, hereinbefore mentioned, become so fused and cured, by this application of steam and pressure, as to produce a substance which has all the valuable properties of vulcanized rubber, and furthermore, the great bulk of this substance may be composed of cheap materials, with only a small portion of rubber, thereby producing vulcanized rubber, or a substance which has all the properties of the same, at a very small cost. By this process also, vulcanized rubber can be worked over a second time, and molded into any desired form, thereby enabling me to use worn out articles made of vulcanized rubber, which have heretofore been destroyed as worthless.

The introduction of water, after the steam is permitted to escape, also forms an important part of the process, as by it the extent to which the rubber shall be cured or indurated can be regulated at pleasure. It will be evident that the consistency of the articles manufactured by this process can be varied by mixing the rubber and other substances in varying proportions.

By a review of the foregoing description, it will be seen that the leading and most important feature of my improvements is the curing again and reproducing of vulcanized rubber from scraps or fragments which have once been vulcanized. Heretofore these substances have been wholly valueless, and have been thrown away as rubbish and my invention in fact constitutes a new manufacture. Another feature which I consider as important, is that whether I apply my process to rubber which has once been vulcanized, or to rubber which has not, I can cure the articles in a very few moments, and can thus save the immense waste of fuel, and loss of time which the ordinary process requires.

The ordinary process of vulcanizing goods is by inserting them in very large ovens or in large steam boilers where they are kept at a graduated temperature from 6 to ten hours.

The proportions and compounds which I have found most convenient are as follows— When I am preparing rubber which has once been vulcanized and then rejected as valueless I take—1 lb. vulcanized rubber, 1 oz. coal tar, 1 oz. to 2 oz. of sulfur. When I prepare rubber in its natural state, I have found the following very good proportions, 1 lb. india rubber, ¾ oz. sulfur, ½ oz. litharge, 1½ lb. of whiting or plaster of Paris. In preparing vulcanized rubber with foreign substances, I generally use the following— 8 lbs. of the above compound—20 lbs. of rags, &c., 2 lbs. sulfur—1 pint coal tar—2 pints of hard coal tar, or asphaltum. It is very evident that any person skilled in the manufacture can vary these proportions to an almost infinite degree, according to the quality of the article desired to be produced, and the machinery for giving the forms to the articles, and for conducting and regulating the heat to the fabric, is capable of an equal variety. I do not therefore limit myself to any peculiar compound, or to any precise arrangement of machinery, but claim the new form and art of reproducing rubber which has once been vulcanized, and which has heretofore been regarded as valueless, and also the improvement in the process of vulcanizing india rubber compound, in the cheap and rapid mode I have described.

Having thus described my improvements, I shall state my claims as follows. I do not claim the curing of india rubber in its natural state, when compounded with sulfur and lead, by the use of heat or of steam, nor do I claim the compounding of sulfur, white lead, or coal tar, with india rubber, all these having been the subjects of previous patents. But

What I do claim and desire to secure by Letters Patent is,—

The improvement in the process of vulcanizing native india rubber or rubber once vulcanized compounded with other articles as above set forth, which consists in heating and curing them with steam and under pressure, and in regulating the application of steam and the induration of the product by the introduction of steam and water as described, by which a very great saving is made in the time and fuel required for the process as herein above stated.

DANIEL HAYWARD.

Witnesses:
 EZRA LINCOLN,
 JOSEPH GAVETT.

[FIRST PRINTED 1913.]